Oct. 8, 1957 G. A. LYON 2,808,909
WHEEL STRUCTURE WITH BRAKE DRUM COOLING MEANS
Filed Sept. 3, 1954 2 Sheets-Sheet 1
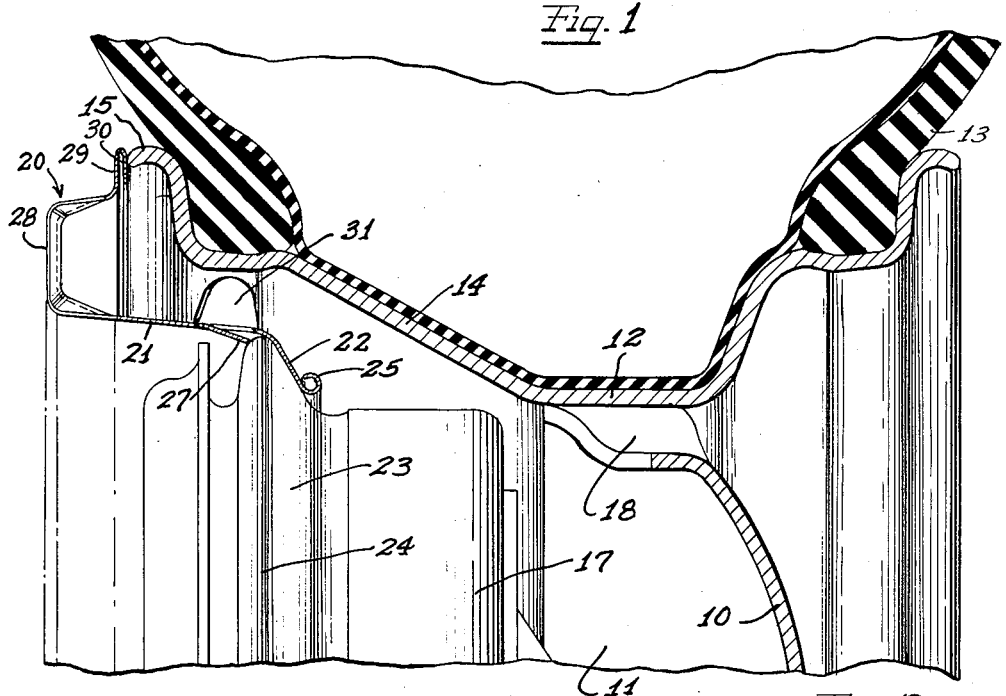
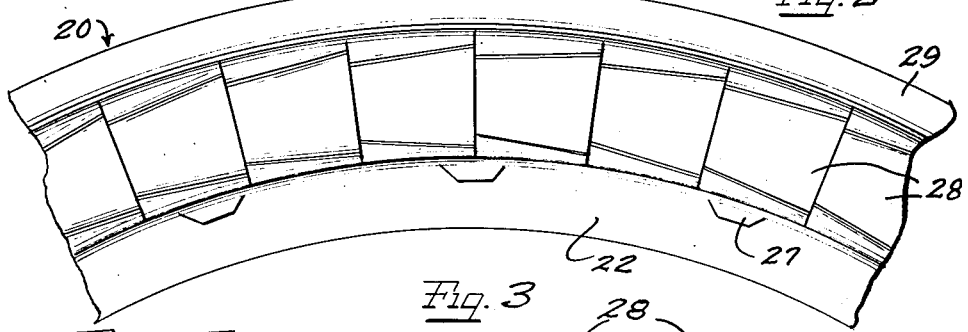
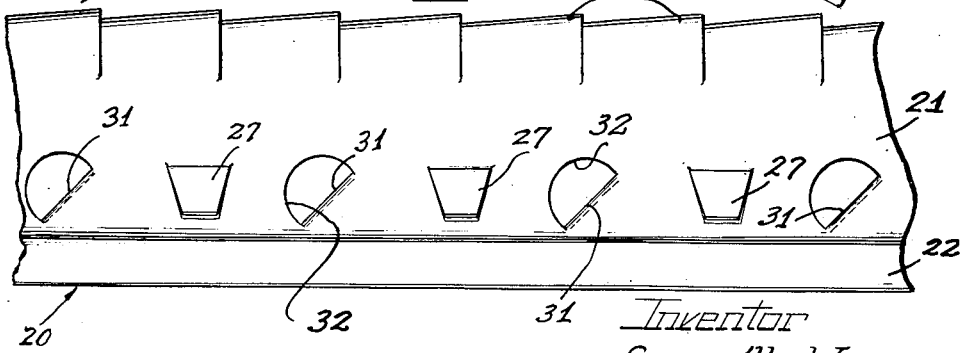
Inventor
George Albert Lyon Oct. 8, 1957  G. A. LYON  2,808,909
WHEEL STRUCTURE WITH BRAKE DRUM COOLING MEANS
Filed Sept. 3, 1954  2 Sheets-Sheet 2

Inventor
George Albert Lyon
by Hill, Sherman, Meroni, Gross, & Simpson Attys.

United States Patent Office 2,808,909
Patented Oct. 8, 1957

2,808,909

WHEEL STRUCTURE WITH BRAKE DRUM COOLING MEANS

George Albert Lyon, Detroit, Mich.

Application September 3, 1954, Serial No. 454,004

13 Claims. (Cl. 188—264)

The present invention relates to improvements in wheel structures and more particularly concerns improvements in means for cooling the brake drums associated with vehicle wheels.

An important object of the present invention is to provide an improved wheel structure having novel means for cooling a brake drum associated with the wheel.

Another object of the invention is to provide improved cooling ring means for use with a wheel including a brake drum.

A further object of the invention is to provide a novel brake drum cooling device adapted to be assembled with the brake drum and having means thereon for self-retention on the brake drum.

Still another object of the invention is to provide a brake drum cooling ring which is adapted to be assembled with a brake drum by a relative axial assembly movement into a more or less permanent assembly with the brake drum.

Other objects, features and advantages of the present invention will be readily apparent from the following detailed description of certain preferred embodiments thereof taken in conjunction with the accompanying drawings, in which:

Figure 1 is a fragmentary radial sectional view, partially in elevation, of a vehicle wheel assembly embodying features of the invention;

Figure 2 is a fragmentary rear elevational view of the cooling ring of Figure 1;

Figure 3 is a fragmentary developed inside plan view of the cooling ring of Figures 1 and 2;

Figure 4:
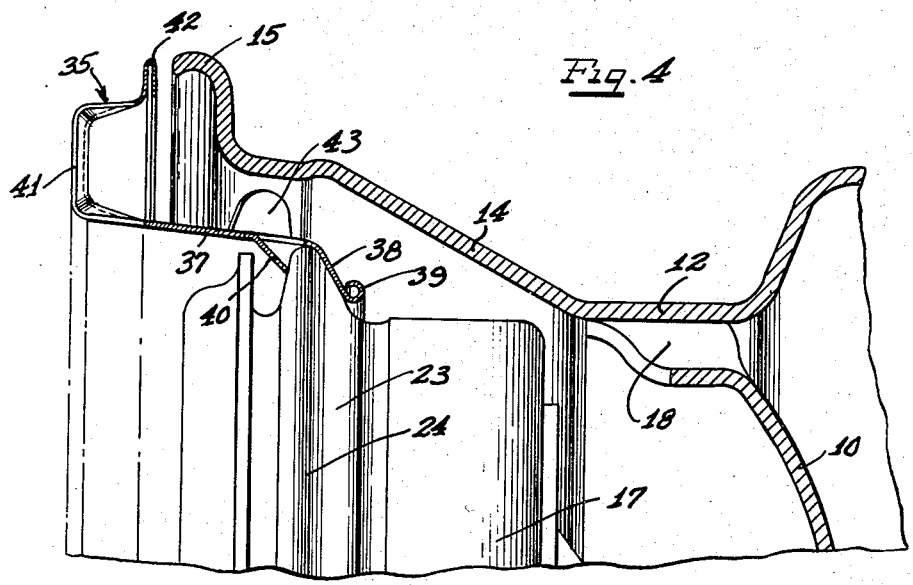
Figure 4 is a fragmentary radial sectional view through the wheel, partially in section, showing a modification.

Having reference to Figures 1, 2 and 3, a wheel with which the present invention is particularly useful comprises a wheel body 10 of the disk spider type having an outer marginal axially inwardly directed flange 11 secured in suitable manner to a base flange 12 of a tire rim. The tire rim is of the multi-flange, drop-center type adapted to support a pneumatic tire and tube assembly 13 but may support a tubeless tire if desired.

In order to accommodate the large size of the tire 13, the tire rim has a generally radially inwardly and axially outwardly angled inner flange 14 of substantial width terminating in a generally radially outwardly and then axially inwardly turned terminal flange 15. Because of its substantial width, the inner tire rim flange 14 completely encompasses a brake drum 17 which is mounted on the axle structure (not shown) to which the wheel is attached in assembly by means of the usual attachment bolts (not shown). While there is a gap between the brake drum 17 and the tire rim flange 14, as shown, communicating with wheel openings 18 between the wheel body 10 and the tire rim flange 12, by reason of the encirclement of the brake drum by the tire rim, the air in the gap between the brake drum and the tire rim is liable to stagnation especially in high speed operation of the vehicle and since the brake drum is, by the shielding effect of the tire rim and the tire, precluded from direct effect of slip stream air, the brakes are liable to overheating.

According to the present invention means are provided for effecting positive movement of air into the gap between the tire rim and the brake drum 17 for cooling the brake drum. In one form, such means comprise an air circulation or cooling ring 20 having a generally axially extending, annular, tubular body 21 which is preferably made from sheet material and may be formed as a stamping or as a rolled section. At its axially outer margin the body 21 is provided with a generally radially inwardly and preferably axially outwardly angled annular flange 22 adapted to engage a generally axially outwardly facing shoulder 23 on the axially inner portion of the brake drum 17 as an incident to movement of the body 21 axially inwardly over a generally radially outwardly projecting annular rib 24 on the brake drum. For reinforcement and finishing, the outer extremity of the flange 22 is preferably formed into an outwardly turned bead 25.

In order to retain the ring 20 on the brake drum against displacement therefrom when the wheel is removed from the assembly, as for changing tires, the ring body 21 is provided with means which will cooperate with the flange 22 to retain the ring against axial displacement. Herein such means comprise a circumferentially spaced series of generally radially inwardly and axially outwardly angled retaining tongues 27 struck out from the body 21 of the ring and having their tips disposed in axially inwardly spaced relation to the flange 22 sufficiently to engage at the axially inner side of the rib 24. The retaining tongues 27 are flexible and thus as the ring body 21 is pushed axially inwardly over the rib 24, the fingers 27 will flex over the rib and then snap down into endwise opposing relation to the rib to hold the ring against axially outward displacement relative to the brake drum.

For promotion of air circulation, the ring 20 has at the axially inner portion of the body 21, a generally U-shaped axially inwardly and radially outwardly directed annular extension portion providing a series of louvers 28 projecting axially inwardly beyond the tire rim terminal flange 15 and lying opposite and across the gap between the tire rim and the brake drum. At the radially outer side of the axially outwardly directed legs of the louvers 28, an annular radially outwardly directed flange 29 connects the louvers integrally in one piece in the ring, and has an underturned reinforcing and finishing flange 30 which is adapted to overlie and preferably engage resiliently under tension with the tip of the terminal flange 15. The louvers 28 are, of course, flared toward mouths that open in the direction of rotation of the ring 20. Furthermore, each of the louvers is preferably tapered toward a smaller trailing end both from the sides or legs of the louvers and from the top so that each louver will function to scoop air not only along its axially inner side or wall but also on its radially inner and outer sides.

To assist in promoting air circulation, the ring body 21 is preferably provided with a series of air circulation promoting vanes 31 which are preferably disposed intermediate the retaining fingers 27 and extend into the space between the body 21 and the adjacent axially inner portion of the tire rim flange 14. In the present instance the vanes 31 are preferably struck out from the body 21 and are angled in the direction of rotation of the ring to assist in moving the air outwardly in the air gap between the tire rim and the brake drum toward the brake drum for cooling circulation thereabout and then exhaust through the wheel openings 18. In such action, additional air may be induced to flow into the gap through openings 32 in the ring body 21 resulting from striking out of the impeller vanes 31.

Where it is desired to have the air cooling ring supported entirely by the brake drum and free from the tire rim, the construction shown in Fig. 4 may be used. In this form the wheel and the brake drum are in all essential respects the same as in Figure 1 and therefore the same reference numerals have been applied to designate identical parts. However, in this form a cooling ring 35 is provided which while it may be substantially like the ring 20 has a tubular generally axially inwardly extending annular body 37 which preferably flares slightly radially outwardly toward an axially inner side of the ring similarly as the ring body 21 so as to facilitate axially inward assembly of the ring onto the brake drum rib 24.

The ring 35 has at the axially outer margin of the ring body 37 a generally radially inwardly and axially outwardly directed marginal stop flange 38 engageable with the shoulder 23 of the brake drum rib and provided with a turned reinforcing and finishing marginal bead 39. Retaining fingers 40 struck from the ring body 37 cooperate with the flange 38 to retain the ring against displacement in either axial direction from the rib 24.

Louvers 41 of substantially the same construction as the louvers 28 are provided at the axially inner portion of the ring body and overlie the gap between the tire rim and the brake drum. In this instance, however, an outer marginal return bent flange structure 42 of the ring member 35 is disposed in assembly in spaced relation to the tip of the terminal flange 15. This may be effected by having the ring body 37 of appropriately greater length.

A series of generally radially outwardly extending and circumferentially angled impeller vanes 43 on the ring body 37, operate similarly as the vanes 31 to promote circulation of air about the brake drum.

Figure 5:
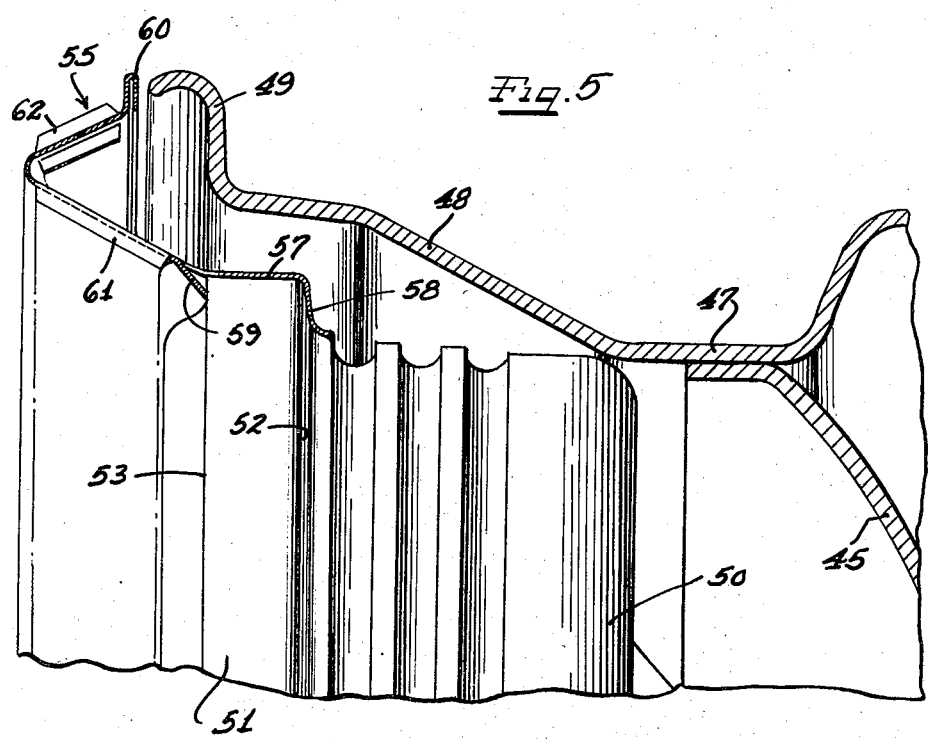
Figure 5 is a fragmentary radial sectional view, partially in elevation, of a further modification.

In the modification of Figure 5 an arrangement is shown adapted specially for situations where the gap between the tire rim and the brake drum narrows down to a severe restriction. In such a wheel a wheel body 45 attached to a tire rim 47 having an inner flange 48 of substantial width leading into a terminal flange 49 is arranged to be mounted in association with a brake drum 50 of substantial width and diameter. As will be observed, the brake drum approaches in closely spaced relation at the axially outer margin to the tire rim so that the gap between the brake drum and the tire rim is severely restricted.

At its axially inner end, the brake drum 50 has an annular rib 51 of substantial width provided at its axially outer side with a generally axially outwardly facing shoulder 52 and at its axially inner side with an axially inwardly facing shoulder 53 and adapted to support a cooling ring 55.

In the present instance the cooling ring 55 has a tubular body portion 57 arranged to fit about the brake drum shoulder 51 and is provided with a generally radially inwardly directed axially outer marginal flange 58 for engaging in stop relation with the brake drum rib shoulder 52. A series of struck out generally radially inwardly and axially outwardly angled resilient retaining fingers 59 on the ring body 57 are directed to engage retainingly with the brake drum shoulder 53 to retain the ring 55 against axially outward displacement relative to the brake drum.

For air circulation promotion, the axially inner portion of the ring body 57 is formed into an annular generally radially outwardly and axially inwardly extending generally channel-shaped structure herein of generally V cross-section providing generally radially inwardly and radially outwardly facing sides, and with a return bent generally radially outwardly and then radially inwardly extending outer marginal reinforcing flange 60 overlying the tip of the terminal flange 49 of the tire rim. At the radially inner side of the channel-shaped formation is provided a series of air scooping louvers 61 struck therefrom, while a series of air scooping louvers 62 is struck from the radially outer side. Thus, in the rotation of the ring 55 with the wheel, both sets of louvers 61 and 62 act to drive air into the gap between the tire rim and the brake drum for effecting cooling circulation of air about the brake drum.

It will be understood that modifications and variations may be effected without departing from the scope of the novel concepts of the present invention.

I claim as my invention:

1. In a wheel structure including a tire rim and a brake drum in annular gap relation and with a rib on the brake drum having axially inwardly and axially outwardly directed faces, a cooling ring encircling the rib of the brake drum and having axially inwardly and outwardly directed portions thereof in retaining engagement with said rib faces to retain the ring against axial displacement relative to the brake drum, one of said portions comprising retaining projection structure.

2. In a wheel structure including a brake drum and a tire rim in gap relation, a cooling ring for disposition across the gap having a leg retainingly engageable with the brake drum and provided with an axially outer flange and generally axially outwardly directed retaining fingers in spaced relation engageable with respectively axially outwardly and axially inwardly facing portions of the brake drum for retaining the ring in axial disposition relative to the brake drum and the tire rim.

3. In a wheel structure including a brake drum having an annular radially outwardly directed axially inner rib, a cooling ring structure having a ring body for engagement about the rib and provided with an axially outer flange engageable with the axially outer side of the rib for retaining the ring against axial inward displacement from the brake drum, and a series of resilient retaining elements on the ring body spaced axially inwardly from said flange and engageable resiliently behind the axially inwardly facing side of said rib to retain the ring against axially outward displacement relative to the brake drum.

4. In a wheel structure including a tire rim and a brake drum about which the axially inner portion of the tire rim is in air gap relation, a ring member for disposition across said gap including louver means for directing air into said gap, and a generally axially outwardly directed radially inner leg engageable about the brake drum and having axially inner and outer spaced retaining means engageable with opposing shoulders on the brake drum to retain the ring against axial displacement in either direction relative to the brake drum, one of said retaining means comprising a circumferential spaced series of biting teeth angled from said inner leg.

5. In a wheel structure including a tire rim and a brake drum encircled by the axially inner portion of the tire rim, a cooling ring mounted on the brake drum and having a generally channel-shaped axially inner portion overlying the gap between the brake drum and the tire rim and the axially inner portion of the tire rim, said cooling ring having louver means thereon provided with portions for scooping in air at the radially inner and radially outer sides of the ring, said louver means comprising transverse generally U-shaped louver scoops provided with mouths that open in one circumferential direction of the ring and opposite receding end portions that are in substantially inset but generally conterminous relation to the respective mouths of the next adjacent louvers.

6. In a wheel structure including a tire rim and a brake drum encircled by the axially inner portion of the tire rim, a cooling ring mounted on the brake drum and having a generally channel-shaped axially inner portion overlying the gap between the brake drum and the tire rim and the axially inner portion of the tire rim, said cooling ring having louver means thereon provided with portions for scooping in air at the radially inner and radially outer sides of the ring, said louver means comprising separate sets of generally radially outwardly and radially inwardly directed and circumferentially angled louvers.

7. In a tire rim and brake drum assembly having an annular air gap therebetween, a cooling ring mounted on the brake drum and extending across the end of said gap for partially overlying the tire rim, said ring having at the axially inner side thereof and axially inwardly from said gap louver means for directing air from the inner side of the wheel toward the brake drum, and in addition impeller vanes spaced axially outwardly relative to the louver means and disposed in the gap for further impelling the air from the louver means toward circulation about the brake drum.

8. In a cooling ring for mounting upon a brake drum, a generally tubular ring body having a marginal flange for engagement with an axially outwardly directed shoulder of a brake drum, and a series of axially outwardly and radially inwardly angled resilient retaining fingers for snapping behind a generally axially inwardly directed shoulder on the brake drum as an incident to pushing the ring axially inwardly into position on the brake drum.

9. In a cooling ring for mounting upon a brake drum, a generally tubular ring body having a marginal flange for engagement with an axially outwardly directed shoulder of a brake drum, and a series of axially outwardly and radially inwardly angled resilient retaining fingers for snapping behind a generally axially inwardly directed shoulder on the brake drum as an incident to pushing the ring axially inwardly into position on the brake drum, said ring body having a series of air impeller vanes adjacent to said fingers and projecting radially outwardly.

10. In a cooling ring for mounting in cooling relation to a brake drum, a generally channel-shaped body in cross-section having at the radially inner side thereof a substantially axially elongated annular body provided at the axially outer extremity thereof with brake drum engaging means, and also having a plurality of brake drum engaging projections spaced axially inwardly from said first mentioned brake drum engaging means cooperable therewith to retain the ring against axial movement in either direction on the brake drum.

11. In a cooling ring for disposition about a brake drum, a tubular generally axially extending ring body having at one margin flange structure for engagement with an opposing stop surface on a brake drum, and resilient elements spaced axially relative to the flange and directed generally theretoward for snapping engagement with another stop surface of the brake drum opposed thereby and facing oppositely to the first mentioned stop surface.

12. In a cooling ring for disposition about a brake drum at the gap between a brake drum and a tire rim, a tubular ring wall having means thereon for retaining the same in assembly with a wheel, said wall having along one margin air motivating louver structure, and having in addition and spaced from said louver structure air motivating vanes that project angularly from the wall and are cooperatively related to the louver structure for motivating air in the rotation of the ring.

13. In a wheel structure including a wheel body with a ribbed brake drum therebehind and a tire rim carried by the wheel body and encircling the brake drum in gap relation at the inner side of the wheel, a cooling ring telescopingly cooperable with said drum in the gap at the inner side of the wheel and having a body structure with generally radially inwardly extending opposed and axially spaced retaining portions defining therebetween a space for receiving generally oppositely axially facing sides of the brake drum rib, said retaining portions on at least one of the said rib sides being resiliently deflectable for assembly of the cooling ring on said drum.

References Cited in the file of this patent
UNITED STATES PATENTS

| | | |
|---|---|---|
| D. 170,952 | Sinclair | Nov. 24, 1953 |
| 1,864,969 | White | June 28, 1932 |
| 2,053,735 | Overholser | Sept. 8, 1936 |
| 2,143,950 | Kliesrath | Jan. 17, 1939 |
| 2,349,658 | Horn | May 23, 1944 |
| 2,624,631 | Lyon | Jan. 6, 1953 |
| 2,659,459 | Lyon | Nov. 17, 1953 |
| 2,659,460 | Lyon | Nov. 17, 1953 |